(12) United States Patent  
Garg et al.

(10) Patent No.: US 8,843,638 B2
(45) Date of Patent: Sep. 23, 2014

(54) HANDING OFF ACTIVE CONNECTIONS

(75) Inventors: Deepak Garg, Nashua, NH (US); Gopal Harikumar, Westford, MA (US); Fugui Wang, Sterling, MA (US)

(73) Assignee: Ericsson Evdo Inc., Dover, DE (US)

( * ) Notice: Subject to any disclaimer, the term of this patent is extended or adjusted under 35 U.S.C. 154(b) by 0 days.

(21) Appl. No.: 11/955,644

(22) Filed: Dec. 13, 2007

(65) Prior Publication Data

US 2009/0156218 A1 Jun. 18, 2009

(51) Int. Cl.
G06F 15/16 (2006.01)
H04W 36/00 (2009.01)
H04W 36/02 (2009.01)

(52) U.S. Cl.
CPC ...... *H04W 36/0083* (2013.01); *H04W 36/0088* (2013.01); *H04W 36/0005* (2013.01); *H04W 36/0016* (2013.01); *H04W 36/0094* (2013.01); *H04W 36/02* (2013.01)
USPC ............................. 709/227; 709/238; 709/242

(58) Field of Classification Search
CPC ................... H04W 36/0083; H04W 36/0088; H04W 36/0005; H04W 36/0016; H04W 36/0094; H04W 36/02
USPC .................................................. 709/227, 228
See application file for complete search history.

(56) References Cited

U.S. PATENT DOCUMENTS

| 5,239,675 A | 8/1993 | Dudczak |
| 5,377,224 A | 12/1994 | Hudson |
| 5,754,945 A | 5/1998 | Lin et al. |
| 5,790,528 A | 8/1998 | Muszynski |
| 5,815,813 A | 9/1998 | Faruque |
| 5,828,661 A * | 10/1998 | Weaver et al. ................ 370/331 |
| 5,852,630 A | 12/1998 | Langberg et al. |
| 5,857,154 A | 1/1999 | Laborde et al. |
| 5,884,177 A | 3/1999 | Hanley |
| 5,930,714 A | 7/1999 | Abu-Amara et al. |
| 5,937,345 A | 8/1999 | McGowan et al. |
| 5,940,762 A | 8/1999 | Lee et al. |
| 5,960,349 A | 9/1999 | Chheda |

(Continued)

FOREIGN PATENT DOCUMENTS

| AU | 1998/72855 | 12/1998 |
| AU | 1998/84574 | 2/1999 |

(Continued)

OTHER PUBLICATIONS

International Search Report mailed Oct. 29, 2002, in corresponding PCT application No. PCT/US2002/020380 (5 pages).

(Continued)

*Primary Examiner* — Tom Y Chang

(57) ABSTRACT

A connection is established between an access terminal and a first radio network controller through a first radio node. The first radio node is controllable primarily by the first radio network controller. The connection is maintained with the first radio network controller as the access terminal moves from a coverage area of the first radio node toward a coverage area of a second radio node. The second radio node is controllable primarily by a second radio network controller and controllable subordinately by the first radio network controller. A connection is also established through the second radio node. Upon a fulfillment of a predetermined criterion, the connection is transferred from the first radio network controller to the second radio network controller.

14 Claims, 3 Drawing Sheets

(56) References Cited

U.S. PATENT DOCUMENTS

Figure 1:
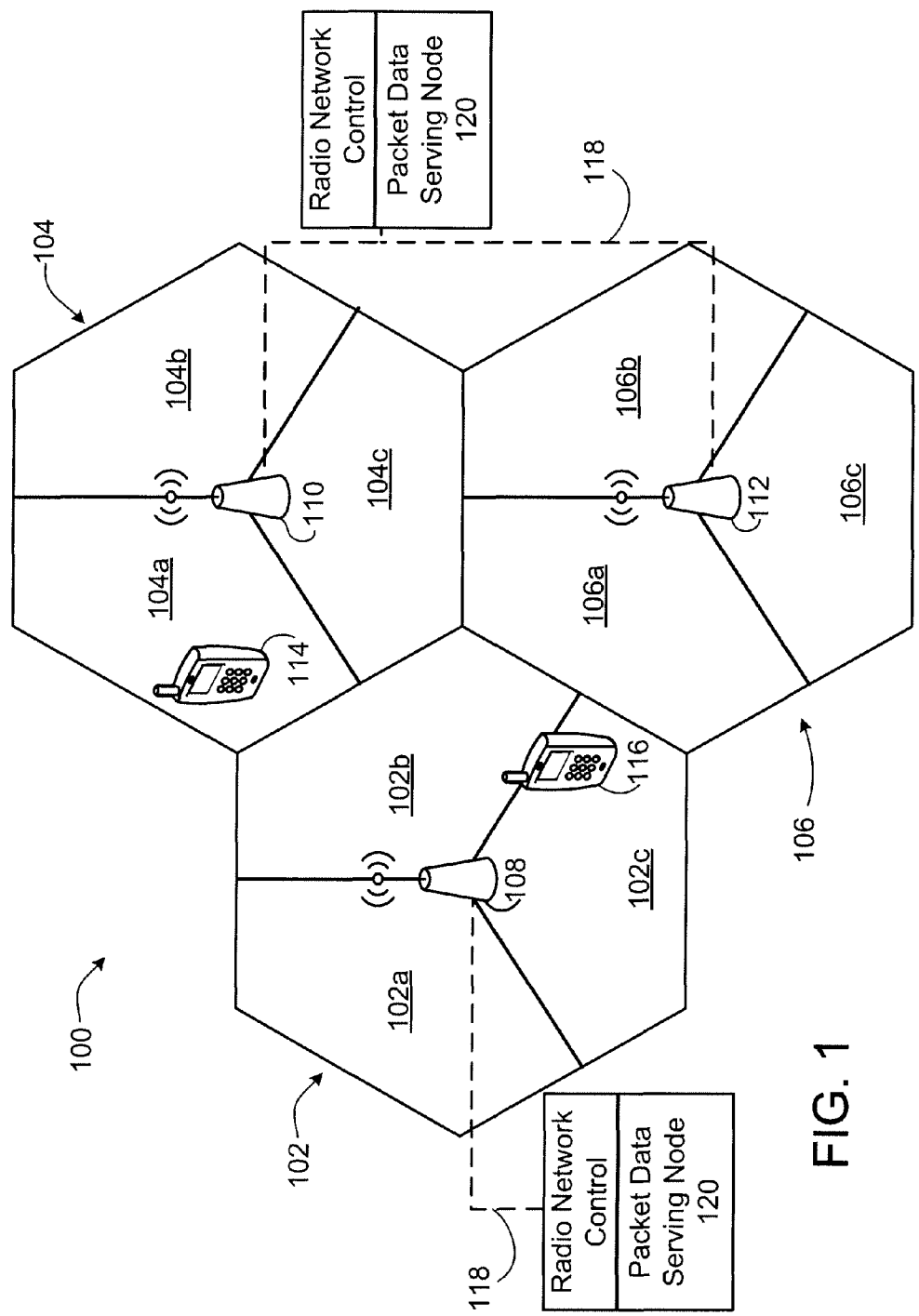

| | | |
|---|---|---|
| 5,974,318 A | 10/1999 | Satarasinghe |
| 5,983,282 A | 11/1999 | Yucebay |
| 6,011,970 A | 1/2000 | McCarthy |
| 6,014,564 A | 1/2000 | Donis et al. |
| 6,016,429 A | 1/2000 | Khafizov et al. |
| 6,023,625 A | 2/2000 | Myers |
| 6,032,033 A | 2/2000 | Morris et al. |
| 6,047,186 A | 4/2000 | Yu et al. |
| 6,049,715 A | 4/2000 | Willhoff et al. |
| 6,052,594 A | 4/2000 | Chuang et al. |
| 6,061,560 A | 5/2000 | Saboorian et al. |
| 6,069,871 A | 5/2000 | Sharma et al. |
| 6,091,953 A | 7/2000 | Ho et al. |
| 6,101,394 A | 8/2000 | Illidge |
| 6,111,857 A | 8/2000 | Soliman et al. |
| 6,112,089 A | 8/2000 | Satarasinghe |
| 6,122,513 A | 9/2000 | Bassirat |
| 6,151,512 A | 11/2000 | Chheda et al. |
| 6,167,036 A | 12/2000 | Beven |
| 6,178,328 B1 | 1/2001 | Tang et al. |
| 6,192,246 B1 | 2/2001 | Satarasinghe |
| 6,198,719 B1 | 3/2001 | Faruque et al. |
| 6,198,910 B1 | 3/2001 | Hanley |
| 6,208,615 B1 | 3/2001 | Faruque et al. |
| 6,219,539 B1 | 4/2001 | Basu et al. |
| 6,233,247 B1 | 5/2001 | Alami et al. |
| 6,246,674 B1 | 6/2001 | Feuerstein et al. |
| 6,252,862 B1 | 6/2001 | Sauer et al. |
| 6,256,300 B1 | 7/2001 | Ahmed et al. |
| 6,266,529 B1 | 7/2001 | Chheda |
| 6,272,148 B1 | 8/2001 | Takagi et al. |
| 6,289,220 B1 | 9/2001 | Spear |
| 6,320,898 B1 | 11/2001 | Newson et al. |
| 6,345,185 B1 | 2/2002 | Yoon et al. |
| 6,366,961 B1 | 4/2002 | Subbiah et al. |
| 6,370,357 B1 | 4/2002 | Xiao et al. |
| 6,370,381 B1 | 4/2002 | Minnick et al. |
| 6,393,482 B1 | 5/2002 | Rai et al. |
| 6,400,712 B1 | 6/2002 | Phillips |
| 6,404,754 B1 | 6/2002 | Lim |
| 6,408,182 B1 | 6/2002 | Davidson et al. |
| 6,418,306 B1 | 7/2002 | McConnell |
| 6,424,834 B1 | 7/2002 | Chang et al. |
| 6,430,168 B1 | 8/2002 | Djurkovic et al. |
| 6,438,370 B1 | 8/2002 | Einola et al. |
| 6,438,376 B1 | 8/2002 | Elliott et al. |
| 6,438,377 B1 | 8/2002 | Savolainen |
| 6,445,922 B1 | 9/2002 | Hiller et al. |
| 6,459,696 B1 | 10/2002 | Carpenter et al. |
| 6,473,399 B1 | 10/2002 | Johansson et al. |
| 6,477,159 B1 | 11/2002 | Yahagi |
| 6,480,476 B1 | 11/2002 | Willars |
| 6,480,718 B1 | 11/2002 | Tse |
| 6,507,741 B1 | 1/2003 | Bassirat |
| 6,522,885 B1 | 2/2003 | Tang et al. |
| 6,539,030 B1 | 3/2003 | Bender et al. |
| 6,542,481 B2 | 4/2003 | Foore et al. |
| 6,542,752 B1 | 4/2003 | Illidge |
| 6,545,984 B1 | 4/2003 | Simmons |
| 6,580,699 B1 | 6/2003 | Manning et al. |
| 6,590,879 B1 | 7/2003 | Huang et al. |
| 6,611,695 B1 | 8/2003 | Periyalwar |
| 6,618,585 B1 | 9/2003 | Robinson et al. |
| 6,621,811 B1 | 9/2003 | Chang et al. |
| 6,628,637 B1 | 9/2003 | Li et al. |
| 6,651,105 B1 | 11/2003 | Bhagwat et al. |
| 6,687,237 B1 | 2/2004 | Lee et al. |
| 6,701,148 B1 | 3/2004 | Carter et al. |
| 6,701,149 B1 | 3/2004 | Bagchi et al. |
| 6,711,144 B1 | 3/2004 | Kim et al. |
| 6,731,618 B1 | 5/2004 | Chung et al. |
| 6,738,625 B1 | 5/2004 | Oom et al. |
| 6,741,862 B2 | 5/2004 | Chung et al. |
| 6,754,191 B1 | 6/2004 | Paranchych et al. |
| 6,757,319 B1 | 6/2004 | Parsa et al. |
| 6,768,903 B2 | 7/2004 | Fauconnier et al. |
| 6,771,962 B2 | 8/2004 | Saifullah et al. |
| 6,781,999 B2 | 8/2004 | Eyuboglu et al. |
| 6,813,498 B1 | 11/2004 | Durga et al. |
| 6,826,402 B1 | 11/2004 | Tran |
| 6,834,050 B1 | 12/2004 | Madour et al. |
| 6,842,630 B2 | 1/2005 | Periyalwar |
| 6,847,821 B1 | 1/2005 | Lewis et al. |
| 6,877,104 B1 | 4/2005 | Shimono |
| 6,909,887 B2 | 6/2005 | Fauconnier et al. |
| 6,944,452 B2 | 9/2005 | Coskun et al. |
| 6,996,056 B2 | 2/2006 | Chheda et al. |
| 6,999,784 B1 | 2/2006 | Choi et al. |
| 7,035,636 B1 | 4/2006 | Lim et al. |
| 7,042,858 B1 | 5/2006 | Jia et al. |
| 7,047,009 B2 | 5/2006 | Laroia et al. |
| 7,072,663 B2 | 7/2006 | Ramos et al. |
| 7,079,511 B2 | 7/2006 | Abrol et al. |
| 7,085,251 B2 | 8/2006 | Rezaiifar |
| 7,110,785 B1 | 9/2006 | Paranchych et al. |
| 7,139,575 B1 | 11/2006 | Chen et al. |
| 7,162,247 B2 | 1/2007 | Baba et al. |
| 7,170,871 B2 | 1/2007 | Eyuboglu et al. |
| 7,177,650 B1 | 2/2007 | Reiger et al. |
| 7,200,391 B2 | 4/2007 | Chung et al. |
| 7,212,822 B1 | 5/2007 | Vicharelli et al. |
| 7,236,764 B2 | 6/2007 | Zhang et al. |
| 7,242,958 B2 | 7/2007 | Chung et al. |
| 7,251,491 B2 | 7/2007 | Jha |
| 7,277,446 B1 | 10/2007 | Abi-Nassif et al. |
| 7,298,327 B2 | 11/2007 | Dupray et al. |
| 7,299,168 B2 | 11/2007 | Rappaport et al. |
| 7,299,278 B2 | 11/2007 | Ch'ng |
| 7,349,699 B1 | 3/2008 | Kelly et al. |
| 7,398,087 B1 | 7/2008 | McConnell et al. |
| 7,408,901 B1 | 8/2008 | Narayanabhatla |
| 7,411,996 B2 | 8/2008 | Kim |
| 7,453,912 B2 | 11/2008 | Laroia et al. |
| 7,457,265 B2 | 11/2008 | Julka et al. |
| 7,512,110 B2 | 3/2009 | Sayeedi et al. |
| 7,546,124 B1 | 6/2009 | Tenneti et al. |
| 7,751,858 B2 | 7/2010 | Chou |
| 8,160,020 B2 | 4/2012 | Eyuboglu et al. |
| 8,195,187 B2 | 6/2012 | Eyuboglu et al. |
| 2002/0025820 A1 | 2/2002 | Fauconnier et al. |
| 2002/0031107 A1 | 3/2002 | Li et al. |
| 2002/0035699 A1 | 3/2002 | Crosbie |
| 2002/0067707 A1 | 6/2002 | Morales et al. |
| 2002/0068570 A1 | 6/2002 | Abrol et al. |
| 2002/0082018 A1 | 6/2002 | Coskun |
| 2002/0085719 A1 | 7/2002 | Crosbie |
| 2002/0102976 A1 | 8/2002 | Newbury et al. |
| 2002/0136226 A1 | 9/2002 | Christoffel et al. |
| 2002/0145990 A1 | 10/2002 | Sayeedi |
| 2002/0193110 A1 | 12/2002 | Julka et al. |
| 2002/0196749 A1 | 12/2002 | Eyuboglu et al. |
| 2003/0003913 A1 | 1/2003 | Chen et al. |
| 2003/0026240 A1 | 2/2003 | Eyuboglu et al. |
| 2003/0031201 A1 | 2/2003 | Choi |
| 2003/0067970 A1 | 4/2003 | Kim |
| 2003/0095513 A1 | 5/2003 | Woodmansee et al. |
| 2003/0100311 A1 | 5/2003 | Chung et al. |
| 2003/0114162 A1 | 6/2003 | Chheda et al. |
| 2003/0117948 A1 | 6/2003 | Ton et al. |
| 2003/0125039 A1 | 7/2003 | Lachtar et al. |
| 2003/0195016 A1 | 10/2003 | Periyalwar |
| 2004/0008649 A1 | 1/2004 | Wybenga et al. |
| 2004/0015607 A1 | 1/2004 | Bender et al. |
| 2004/0038700 A1 | 2/2004 | Gibbs |
| 2004/0068668 A1 | 4/2004 | Lor et al. |
| 2004/0081111 A1 | 4/2004 | Bae et al. |
| 2004/0179492 A1 | 9/2004 | Zhang et al. |
| 2004/0214574 A1 | 10/2004 | Eyuboglu et al. |
| 2004/0224687 A1 | 11/2004 | Rajkotia |
| 2004/0266436 A1 | 12/2004 | Jaakkola et al. |
| 2005/0025116 A1 | 2/2005 | Chen et al. |
| 2005/0053034 A1 | 3/2005 | Chiueh |
| 2005/0111429 A1 | 5/2005 | Kim et al. |
| 2005/0113117 A1 | 5/2005 | Bolin et al. |

(56) References Cited

U.S. PATENT DOCUMENTS

| | | |
|---|---|---|
| 2005/0124343 A1 | 6/2005 | Kubo |
| 2005/0148297 A1 | 7/2005 | Lu et al. |
| 2005/0181795 A1 | 8/2005 | Mark et al. |
| 2005/0207368 A1 | 9/2005 | Nam |
| 2005/0213555 A1 | 9/2005 | Eyuboglu et al. |
| 2005/0223097 A1* | 10/2005 | Ramsayer et al. ............ 709/227 |
| 2005/0233746 A1 | 10/2005 | Laroia et al. |
| 2005/0243749 A1 | 11/2005 | Mehrabanzad et al. |
| 2005/0245279 A1 | 11/2005 | Mehrabanzad et al. |
| 2006/0030323 A1 | 2/2006 | Ode et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0126556 A1 | 6/2006 | Jiang et al. |
| 2006/0146751 A1* | 7/2006 | Obuchi et al. ................ 370/331 |
| 2006/0148460 A1 | 7/2006 | Mukherjee et al. |
| 2006/0159045 A1 | 7/2006 | Ananthaiyer et al. |
| 2006/0182063 A1 | 8/2006 | Jia et al. |
| 2006/0183497 A1 | 8/2006 | Paranchych et al. |
| 2006/0209760 A1 | 9/2006 | Saito et al. |
| 2006/0209882 A1 | 9/2006 | Han et al. |
| 2006/0240782 A1 | 10/2006 | Pollman et al. |
| 2006/0264218 A1 | 11/2006 | Zhang et al. |
| 2006/0291420 A1 | 12/2006 | Ng |
| 2006/0294241 A1 | 12/2006 | Cherian et al. |
| 2007/0022396 A1 | 1/2007 | Attar et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0099632 A1 | 5/2007 | Choksi |
| 2007/0105527 A1 | 5/2007 | Nylander et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153750 A1 | 7/2007 | Baglin et al. |
| 2007/0155329 A1 | 7/2007 | Mehrabanzad et al. |
| 2007/0197220 A1 | 8/2007 | Willey |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070574 A1 | 3/2008 | Vikberg et al. |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0273493 A1 | 11/2008 | Fong et al. |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103494 A1 | 4/2009 | Jia et al. |
| 2009/0116445 A1 | 5/2009 | Samar et al. |
| 2009/0129334 A1 | 5/2009 | Fong et al. |
| 2009/0156218 A1 | 6/2009 | Garg et al. |
| 2009/0191878 A1* | 7/2009 | Hedqvist et al. ............. 455/441 |
| 2012/0243476 A1 | 9/2012 | Eyuboglu et al. |

FOREIGN PATENT DOCUMENTS

| | | |
|---|---|---|
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| CN | 101015224 B | 5/2012 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| GB | 2447585 | 10/2010 |
| HK | 1101334 A | 10/2007 |
| JP | 2007-538476 | 12/2007 |
| JP | 2008-547329 | 12/2008 |
| JP | 2008-547358 | 12/2008 |
| JP | 5117188 B2 | 10/2012 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | WO01/86988 | 11/2001 |
| WO | WO02/071633 | 9/2002 |
| WO | WO02/071652 | 9/2002 |
| WO | WO03/001820 | 1/2003 |
| WO | WO03/009576 | 1/2003 |
| WO | WO 03/043364 | 5/2003 |
| WO | WO03/054721 | 7/2003 |
| WO | WO03/081938 | 10/2003 |
| WO | WO2004/064434 | 7/2004 |
| WO | WO2005/012520 | 12/2005 |
| WO | WO2005/115026 | 12/2005 |
| WO | WO2006/081527 | 8/2006 |
| WO | WO 2007/002659 | 1/2007 |
| WO | WO2007/028122 | 3/2007 |
| WO | WO2007/028252 | 3/2007 |
| WO | WO 2007/044099 | 4/2007 |
| WO | WO2007/045101 | 4/2007 |
| WO | WO 2007/075446 | 7/2007 |
| WO | WO 2007/078766 | 7/2007 |
| WO | WO2007/078766 | 5/2011 |

OTHER PUBLICATIONS

International Search Report and Written Opinion mailed Oct. 26, 2006, in corresponding PCT application No. PCT/US2005/17385 (14 pages).

International Search Report and Written Opinion mailed Apr. 26, 2007, in corresponding PCT application No. PCT/US2006/24958 (10 pages).

(56) References Cited

OTHER PUBLICATIONS

International Preliminary Report on Patentability for Application No. PCT/US2005/017385, Dec. 7, 2006, 8 pages.
International Preliminary Report on Patentability for Application No. PCT/US2006/024958, Jan. 17, 2008, 7 pages.
EP Examination Report for Application No. 06785637.7, Feb. 6, 2008, 2 pages.
U.S. Appl. No. 09/891,103, filed Jun. 25, 2001, including application as filed.
PCT application No. PCT/US2002/020380 filed on Jun. 25, 2002, with Publication No. WO2003/001820, including application as filed.
U.S. Appl. No. 11/640,619, filed Dec. 18, 2006, including application as filed.
PCT application No. PCT/US2005/17385 filed on May 17, 2005, with Publication No. WO2005/115026, including application as filed.
U.S. Appl. No. 11/037,896, filed Jan. 18, 2005, including application as filed.
U.S. Appl. No. 11/167,785, filed Jun. 27, 2005, including application as filed.
PCT application No. PCT/US2006/24958 filed on Jun. 27, 2006, with Publication No. WO2007/002659, including application as filed.
U.S. Appl. No. 11/243,405, filed Oct. 4, 2005, including application as filed.
U.S. Appl. No. 11/303,773, filed Dec. 16, 2005, including application as filed.
U.S. Appl. No. 11/305,286, filed Dec. 16, 2005, including application as filed.
PCT application No. PCT/US2006/47524 filed on Dec. 13, 2006, with Publication No. WO2007/078766, including application as filed.
U.S. Appl. No. 11/303,774, filed Dec. 16, 2005, including application as filed.
PCT application No. PCT/US2006/47963 filed on Dec. 15, 2006, with Publication No. WO2007/075446, including application as filed.
Paul Bender, et al., "CDMA/HDR: A Bandwidth-Efficient High-Speed Wireless Data Service for Nomadic Users", IEEE Communications Magazine, Jul. 2000.
Paul Bender & Ramin Rezalifar, "Draft Baseline Text for the 1×EV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
Goran Janevski, "IP—Based Mobile Wireless Access Network Architecture", Nortel Networks-MWIF Contribution, Draft dated Sep. 7, 2000.
Office Action and response from European Patent Office for Application No. 06836082.5 mailed Jun. 18, 2009 and sent Jul. 21, 2009 (21 pages).
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
International Search Report and Written Opinion for PCT international application No. PCT/US2006/047524, mailed May 26, 2009 (13 pages).
Chinese Office action of Chinese application No. 200580024230.0 mailed Mar. 15, 2009 (13 pages).
EP Examination Report for Application No. 05750705.5, Jan. 9, 2007 (2 pages).
Australian (AU) Examination Report for Application No. 2005426813, Jun. 4, 2009 (18 pages).
Office action and response history of U.S. Appl. No. 11/402,744 to Aug. 17, 2009.
Office action and response history of U.S. Appl. No. 11/486,545 to Aug. 26, 2009.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Office action and response history of U.S. Appl. No. 11/037,896 to Sep. 17, 2009.
Office action and response history of U.S. Appl. No. 11/303,774 to Sep. 17, 2009.
GB Examination Report for Application No. 0811839.0, mailed Jan. 22, 2010 (2 pages).
U.S. Appl. No. 10/848,597, filed May 18, 2004, now U.S. Patent No. 7,170,871, issued Jan. 30, 2007, including application as filed.
PCT application No. PCT/US2006/025018 filed on Jun. 26, 2006, with Publication No. WO2007/044099, including application as filed.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project 2 "3GPP2", "cdma2000 High Rate Packet Data Interface Specification", C.S0024, version 2, Oct. 27, 2000, see pp. 113-153.
3rd Generation Partnership Project 2 "3GPP2", "cdma2000 High Rate Packet Data Interface Specification", C.S0024-B, version 2, Mar. 2007, see pp. 307-401.
Library Search for Nortel and frequency handoff. Search results dated Aug. 28, 2009, see pp. 4, 7, 9, 11, 19, 25, 29, 32, 41, 45, 49, 52, 56-60, 65 and 70.
Rashid Attar et al., "Evolution of cdma2000 Cellular Networks: Multicarrier EV-DO", IEEE Communications Magazine, Mar. 2006. pp. 46-53.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
TIA/EIA/IS-2001, Interoperability Specification (IOS) for CDMA2000 Network Access Interfaces, Aug. 2001 (revised version of May 2000).
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
European Patent Office communication and response of European application No. 06836082.5 mailed Jun. 18, 2009 (21 pages).
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
USPTO Non-Final Office Action in U.S. Appl. No. 11/243,405, dated Jan. 30, 2008, 7 pages.
Fish & Richardson P.C., Amendment in Reply to Action dated Jan. 30, 2008 in U.S. Appl. No. 11/243,405, filed May 30, 2008, 9 pages.

(56) References Cited

OTHER PUBLICATIONS

USPTO Non-Final Office Action in U.S. Appl. No. 11/243,405, dated Jul. 10, 2008, 13 pages.
Fish & Richardson P.C., Reply to Action dated Jul. 10, 2008 in U.S. Appl. No. 11/243,405, filed Dec. 10, 2008, 8 pages.
USPTO Final Office Action in U.S. Appl. No. 11/243,405, dated Feb. 12, 2009, 14 pages.
Fish & Richardson P.C., Amendment in Reply to Action dated Jan. 12, 2009 in U.S. Appl. No. 11/243,405, filed Apr. 10, 2009, 14 pages.
USPTO Advisory Action in U.S. Appl. No. 11/243,405, dated Apr. 23, 2009, 3 pages.
USPTO Advisory Action in U.S. Appl. No. 11/243,405, dated May 13, 2009, 3 pages.
USPTO Non-Final Office Action in U.S. Appl. No. 11/243,405, dated Jun. 22, 2009, 11 pages.
Fish & Richardson P.C., Notice of Appeal and Pre-Appeal Brief Request for Review in U.S. Appl. No. 11/243,405, filed Sep. 22, 2009, 6 pages.
USPTO Notice of Panel Decision from Pre-Appeal Brief Review in U.S. Appl. No. 11/243,405, dated Oct. 22, 2009, 2 pages.
USPTO Interview Summary in U.S. Appl. No. 11/243,405, dated Nov. 5, 2009, 3 pages.
USPTO Notice of Allowance in U.S. Appl. No. 11/243,405, dated Jan. 6, 2010, 4 pages.
USPTO Non-Final Office Action in U.S. Appl. No. 11/303,773, dated Apr. 2, 2008, 11 pages.
Fish & Richardson P.C., Amendment in Reply to Action dated Apr. 2, 2008 in U.S. Appl. No. 11/303,773, filed Aug. 4, 2008, 19 pages.
USPTO Final Office Action in U.S. Appl. No. 11/303,773, dated Oct. 22, 2008, 14 pages.
Fish & Richardson P.C., Amendment in Reply to Action dated Oct. 22, 2008 in U.S. Appl. No. 11/303,773, filed Feb. 23, 2009, 16 pages.
USPTO Interview Summary in U.S. Appl. No. 11/303,773, dated Feb. 26, 2009, 2 pages.
USPTO Non-Final Office Action in U.S. Appl. No. 11/303,773, dated Mar. 13, 2009, 14 pages.
Fish & Richardson P.C., Reply to Action dated Mar. 13, 2009 in U.S. Appl. No. 11/303,773, filed Aug. 13, 2009, 22 pages.
USPTO Final Office Action in U.S. Appl. No. 11/303,773, dated Nov. 18, 2009, 14 pages.
Fish & Richardson P.C., Amendment in Reply to Action dated Nov. 18, 2009 in U.S. Appl. No. 11/303,773, filed Feb. 18, 2010, 22 pages.
USPTO Non-Final Office Action in U.S. Appl. No. 11/303,773, dated Mar. 11, 2010, 14 pages.
Fish & Richardson P.C., Reply to Action dated Mar. 11, 2010 in U.S. Appl. No. 11/303,773, filed Jun. 11, 2010, 23 pages.
USPTO Non-Final Office Action in U.S. Appl. No. 11/305,286, dated Oct. 8, 2008, 12 pages.
Fish & Richardson P.C., Amendment in Reply to Action dated Oct. 8, 2008 in U.S. Appl. No. 11/305,286, filed Feb. 27, 2009, 25 pages.
USPTO Final Office Action in U.S. Appl. No. 11/305,286, dated Jun. 1, 2009, 22 pages.
Fish & Richardson P.C., Amendment in Reply to Action dated Jun. 1, 2009 in U.S. Appl. No. 11/305,286, filed Sep. 30, 2009, 27 pages.
USPTO Non-Final Office Action in U.S. Appl. No. 11/305,286, dated Dec. 30, 2009, 27 pages.
Fish & Richardson P.C., Amendment in Reply to Action dated Dec. 30, 2009 in U.S. Appl. No. 11/305,286, filed Mar. 30, 2010, 31 pages.
USPTO Final Office Action in U.S. Appl. No. 11/305,286, dated Jun. 24, 2010, 39 pages.
USPTO Non-Final Office Action in U.S. Appl. No. 11/303,774, dated Apr. 4, 2008, 8 pages.
Fish & Richardson P.C., Amendment in Reply to Action dated Apr. 4, 2008 in U.S. Appl. No. 11/303,774, filed Aug. 29, 2008, 13 pages.
USPTO Non-Final Office Action in U.S. Appl. No. 11/303,774, dated Nov. 20, 2008, 8 pages.
Fish & Richardson P.C., Amendment in Reply to Action dated Nov. 20, 2008 in U.S. Appl. No. 11/303,774, filed Mar. 19, 2009, 12 pages.
USPTO Final Office Action in U.S. Appl. No. 11/303,774, dated Jun. 12, 2009, 8 pages.
Fish & Richardson P.C., Amendment in Reply to Action dated Jun. 12, 2009 in U.S. Appl. No. 11/303,774, filed Aug. 13, 2009, 15 pages.
USPTO Non-Final Office Action in U.S. Appl. No. 11/303,774, dated Sep. 10, 2009, 9 pages.
Fish & Richardson P.C., Amendment in Reply to Action dated Sep. 10, 2009 in U.S. Appl. No. 11/303,774, filed Dec. 10, 2009, 18 pages.
USPTO Final Office Action in U.S. Appl. No. 11/303,774, dated Mar. 10, 2010, 9 pages.
Fish & Richardson P.C., Amendment in Reply to Action dated Mar. 10, 2010 in U.S. Appl. No. 11/303,774, filed Jun. 10, 2010, 14 pages.
USPTO Non-Final Office Action in U.S. Appl. No. 11/402,744, dated Oct. 8, 2008, 14 pages.
Fish & Richardson P.C., Amendment in Reply to Action dated Oct. 8, 2008 in U.S. Appl. No. 11/402,744, filed Jan. 8, 2009, 15 pages.
USPTO Non-Final Office Action in U.S. Appl. No. 11/402,744, dated Apr. 17, 2009, 14 pages.
Fish & Richardson P.C., Amendment in Reply to Action dated Apr. 17, 2009 in U.S. Appl. No. 11/402,744, filed Aug. 17, 2009, 12 pages.
USPTO Final Office Action in U.S. Appl. No. 11/402,744, dated Nov. 25, 2009, 13 pages.
Fish & Richardson P.C., Amendment in Reply to Action dated Nov. 25, 2009 in U.S. Appl. No. 11/402,744, filed Feb. 25, 2010, 14 pages.
USPTO Non-Final Office Action in U.S. Appl. No. 11/402,744, dated Mar. 30, 2010, 14 pages.
USPTO Non-Final Office Action in U.S. Appl. No. 11/486,545, dated Aug. 19, 2009, 17 pages.
Fish & Richardson P.C., Amendment in Reply to Action dated Aug. 19, 2009 in U.S. Appl. No. 11/486,545, filed Nov. 19, 2009, 24 pages.
Fish & Richardson P.C., Supplemental Amendment in Reply to Action dated Aug. 19, 2009 in U.S. Appl. No. 11/486,545, filed Nov. 20, 2009, 24 pages.
USPTO Final Office Action in U.S. Appl. No. 11/486,545, dated Jan. 29, 2010, 13 pages.
Fish & Richardson P.C., Amendment in Reply to Action dated Jan. 29, 2010 in U.S. Appl. No. 11/486,545, filed Apr. 29, 2010, 19 pages.
USPTO Advisory Action in U.S. Appl. No. 11/486,545, dated May 7, 2010, 3 pages.
Fish & Richardson, P.C., Preliminary Amendment in U.S. Appl. No. 09/891,103, filed Aug. 1, 2004, 11 pages.
USPTO Non Final Office Action in U.S. Appl. No. 09/891,103, dated Jan. 28, 2005, 8 pages.
Fish & Richardson, P.C., Amendment in Reply to Action dated Jan. 28, 2005 in U.S. Appl. No. 09/891,103, filed Jul. 29, 2005, 28 pages.
USPTO Final Office Action in U.S. Appl. No. 09/891,103, dated Nov. 3, 2005, 11 pages.
Fish & Richardson, P.C., Amendment in Reply to Action dated Nov. 3, 2005 in U.S. Appl. No. 09/891,103, filed Mar. 3, 2006, 24 pages.
USPTO Non Final Office Action in U.S. Appl. No. 09/891,103, dated May 17, 2006, 10 pages.
Fish & Richardson, P.C., Amendment in Reply to Action dated May 17, 2006 in U.S. Appl. No. 09/891,103, filed Nov. 20, 2006, 30 pages.
USPTO Non Final Office Action in U.S. Appl. No. 09/891,103, dated Jun. 11, 2007, 23 pages.
Fish & Richardson, P.C., Amendment in Reply to Action dated Jun. 11, 2007 in U.S. Appl. No. 09/891,103, filed Nov. 2, 2007, 32 pages.
USPTO Final Office Action in U.S. Appl. No. 09/891,103, dated Jan. 31, 2008, 24 pages.
Fish & Richardson, P.C., Amendment in Reply to Action dated Jan. 31, 2008 in U.S. Appl. No. 09/891,103, filed May 12, 2008, 36 pages.
USPTO Advisory Action in U.S. Appl. No. 09/891,103, dated Jun. 5, 2008, 3 pages.
Fish & Richardson, P.C., Amendment in Reply to Action dated Jan. 31, 2008 in U.S. Appl. No. 09/891,103, filed Jun. 30, 2008, 36 pages.
Fish & Richardson, P.C., Supplemental Amendment in Reply to Action dated Jan. 31, 2008 in U.S. Appl. No. 09/891,103, filed Jul. 10, 2008, 36 pages.
USPTO Non Final Office Action in U.S. Appl. No. 09/891,103, dated Sep. 16, 2008, 26 pages.
Fish & Richardson, P.C., Supplemental Amendment in Reply to Action dated Sep. 16, 2008 in U.S. Appl. No. 09/891,103, filed Jan. 14, 2009, 39 pages.
USPTO Non Final Office Action in U.S. Appl. No. 09/891,103, dated Apr. 29, 2009, 27 pages.

(56) References Cited

OTHER PUBLICATIONS

Fish & Richardson, P.C., Amendment in Reply to Action dated Apr. 29, 2009 in U.S. Appl. No. 09/891,103, filed Jul. 29, 2009, 40 pages.
Notice of Allowance in U.S. Appl. No. 09/891,103, dated Nov. 10, 2009, 4 pages.
Notice of Allowance in U.S. Appl. No. 09/891,103, dated Feb. 17, 2010, 4 pages.
Notice of Allowance in U.S. Appl. No. 09/891,103, dated Jun. 14, 2010, 6 pages.
Non Final Office Action in U.S. Appl. No. 11/640,619, dated Nov. 2, 2009, 18 pages.
Fish & Richardson, P.C., Amendment in Reply to Action dated Nov. 2, 2009 in U.S. Appl. No. 11/640,619, filed Mar. 2, 2010, 13 pages.
Interview Summary in U.S. Appl. No. 11/640,619, dated Mar. 12, 2010, 3 pages.
Non Final Office Action in U.S. Appl. No. 11/640,619, dated Jun. 18, 2010, 20 pages.
Non Final Office Action in U.S. Appl. No. 11/166,893, dated Aug. 5, 2008, 41 pages.
Fish & Richardson, P.C., Amendment in Reply to Action dated Aug. 5, 2008 in U.S. Appl. No. 11/166,893, filed Dec. 4, 2008, 22 pages.
Final Office Action in U.S. Appl. No. 11/166,893, dated Mar. 5, 2009, 26 pages.
Fish & Richardson, P.C., Amendment in Reply to Action dated Mar. 5, 2009 in U.S. Appl. No. 11/166,893, filed Apr. 24, 2009, 19 pages.
Fish & Richardson, P.C., Amendment in Reply to Action dated Mar. 5, 2009 in U.S. Appl. No. 11/166,893, filed Apr. 30, 2009, 21 pages.
Non Final Office Action in U.S. Appl. No. 11/166,893, dated Aug. 4, 2009, 28 pages.
Fish & Richardson, P.C., Amendment in Reply to Action dated Aug 4, 2009 in U.S. Appl. No. 11/166,893, filed Dec. 1, 2009, 23 pages.
Interview Summary in U.S. Appl. No. 11/166,893, dated Dec. 8, 2009, 3 pages.
Final Action in U.S. Appl. No. 11/166,893, dated Mar. 25, 2010, 30 pages.
Fish & Richardson, P.C., Amendment in reply to Action dated Mar. 25, 2010 in U.S. Appl. No. 11/166,893, dated Jun. 25, 2010, 19 pages.
Examiner Interview Summary in U.S. Appl. No. 11/166,893, dated Jun. 30, 2009, 4 pages.
Non Final Office Action in U.S. Appl. No. 11/037,896, dated Nov. 21, 2007, 15 pages.
Fish & Richardson, P.C., Amendment in reply to Action dated Nov. 21, 2007 in U.S. Appl. No. 11/037,896, dated Feb. 21, 2008, 20 pages.
Final Office Action in U.S. Appl. No. 11/037,896, dated Jul. 10, 2008, 27 pages.
Non Final Office Action in U.S. Appl. No. 11/037,896, dated Feb. 5, 2009, 26 pages.
Fish & Richardson, P.C., Amendment in reply to Action dated Feb. 5, 2009 in U.S. Appl. No. 11/037,896, dated May 5, 2009, 26 pages.
Final Office Action in U.S. Appl. No. 11/037,896, dated Sep. 10, 2009, 29 pages.
Fish & Richardson, P.C., Amendment in reply to Action dated Sep. 10, 2009 in U.S. Appl. No. 11/037,896, dated Jan. 11, 2010, 26 pages.
Fish & Richardson, P.C., Amendment in reply to Action dated Jun. 16, 2010 in U.S. Appl. No. 11/037,896, dated Jun. 28, 2010, 21 pages.
Notice of Allowance in U.S. Appl. No. 11/037,896, dated Feb. 22, 2010, 6 pages.
Notice of Allowance in U.S. Appl. No. 11/037,896, dated Jun. 16, 2010, 5 pages.
Non Final Office Action in U.S. Appl. No. 11/167,785, dated Nov. 15, 2007, 7 pages.
Fish & Richardson, P.C., Amendment in reply to Action dated Nov. 15, 2007 in U.S. Appl. No. 11/167,785, dated Apr. 10, 2008, 14 pages.
Final Office Action in U.S. Appl. No. 11/167,785, dated Jul. 21, 2008, 10 pages.
Non Final Office Action in U.S. Appl. No. 11/167,785, dated Jun. 22, 2009, 9 pages.
Fish & Richardson, P.C., Amendment in reply to Action dated Jun. 22, 2009 in U.S. Appl. No. 11/167,785, dated Sep. 22, 2009, 18 pages.

Final Office Action in U.S. Appl. No. 11/167,785, dated Jan. 11, 2010, 11 pages.
Fish & Richardson, P.C., Amendment in reply to Action dated Jan. 11, 2010 in U.S. Appl. No. 11/167,785, dated Apr. 12, 2010, 16 pages.
Non Final Office Action in U.S. Appl. No. 11/167,785, dated Apr. 28, 2010, 9 pages.
USPTO Notice of Allowance in U.S. Appl. No. 11/486,545, dated Jul. 28, 2010, 8 pages.
Fish & Richardson, P.C., Amendment in Reply to Action dated Mar. 25, 2010 in U.S. Appl. No. 11/166,893, filed Jun. 28, 2010, 19 pages.
Response filed Aug. 9, 2010 to GB Examination Report for Application No. 0811839.0, dated Jun. 3, 2010 (10 pages).
Response filed Aug. 2, 2010 to Chinese office action for Chinese application No. 200580024230.0 dated May 17, 2010 (40 pages).
USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed Aug. 30, 2010, 12 pages.
Notice of Allowance in U.S. Appl. No. 11/303,774, dated Aug. 31, 2010, 4 pages.
USPTO Office Action in U.S. Appl. No. 11/166,893, dated Sep. 2, 2010, 31 pages.
USPTO Notice of Allowance in U.S. Appl. No. 11/303,774, dated Aug. 31, 2010, 4 pages.
USPTO Non-Final Office Action in U.S. Appl. No. 11/402,744, dated Apr. 1, 2011, 14 pages.
Notice of Allowance in U.S. Appl. No. 11/303,774, dated Apr. 4, 2011, 7 pages.
Notice of Allowance in U.S. Appl. No. 11/303,773, dated Apr. 15, 2011, 6 pages.
USPTO Supplemental Notice of Allowance in U.S. Appl. No. 11/166,893, dated Apr. 22, 2011, 17 pages.
International Preliminary Report on Patentability for PCT international application No. PCT/US2006/047524, mailed Apr. 28, 2011 (8 pages).
Notice of Allowance in U.S. Appl. No. 11/037,896, dated May 17, 2011, 8 pages.
Response filed May 30, 2011 to Japanese Office action issued in application No. 2007-527408, Nov. 24, 2010, mailed Nov. 29, 2010 (31 pages).
Fish & Richardson, P.C., Amendment in Reply to Office Action dated Apr. 1, 2011 in U.S. Appl. No. 11/402,744, filed Jun. 30, 2011, 13 pages.
USPTO Final Office Action in U.S. Appl. No. 11/402,744, dated Oct. 6, 2011, 14 pages.
Non Final Office Action in U.S. Appl. No. 11/037,896, dated Oct. 20, 2011, 28 pages.
USPTO Notice of Appeal Decision in U.S. Appl. No. 11/167,785, dated May 3, 2011, 2 pages.
Fish & Richardson, P.C., Response to Notice of Appeal Decision dated May 3, 2011 in U.S. Appl. No. 11/167,785, filed Nov. 3, 2011, 13 pages.
Japanese Office action issued in application No. 2007-527408 on Nov. 11, 2011, mailed Nov. 16, 2011 (5 pages).
Fish & Richardson, P.C., Response to Final Office Action dated Oct. 6, 2011 in U.S. Appl. No. 11/402,744, filed Jan. 6, 2012, 13 pages.
Fish & Richardson, P.C., Response to Non Final Office Action dated Oct. 20, 2011 in U.S. Appl. No. 12/857,206, filed Mar. 20, 2012, 19 pages.
Fish & Richardson, P.C., Response to Final Office Action dated May 24, 2012 in U.S. Appl. No. 12/857,206, filed Aug. 23, 2012, 17 pages.
Supplemental Search Report from European Application No. 05750705.5 issued Aug. 2, 2012 (102 pages).
Fish & Richardson, P.C., Response to Non Final Office Action dated Jun. 7, 2012 in U.S. Appl. No. 11/167,785, filed Sep. 6, 2012, 11 pages.
Fish & Richardson, P.C., Response to Notice of Panel Decision from Pre-Appeal Brief Review dated Feb. 23, 2012 in U.S. Appl. No. 11/402,744, filed May 23, 2012, 11 pages.
Final Office Action in U.S. Appl. No. 11/037,896, dated May 24, 2012, 29 pages.

(56) References Cited

OTHER PUBLICATIONS

Response to Japanese Office action issued in application No. 2007-527408 on Nov. 11, 2011, mailed Nov. 16, 2011, response filed May 16, 2012 (26 pages).
Chinese Office action response of Chinese application No. 200580024230.0 sent Jul. 22, 2009 (8 pages).
European Patent Office communication from European application No. 06785637.7 mailed Apr. 27, 2012 (2 pages).
European Search Report from European Application No. 06836082.5 mailed Apr. 26, 2013 (80 pages).
USPTO Non Final Office Action in U.S. Appl. No. 13/430,422, dated Dec. 7, 2012, 6 pages.
USPTO Non Final Office Action in U.S. Appl. No. 11/167,785, dated Dec. 6, 2012, 9 pages.
Fish & Richardson, P.C., Response to Non Final Office Action dated Dec. 7, 2012 in U.S. Appl. No. 13/430,422, filed Mar. 4, 2013, 9 pages.
Fish & Richardson, P.C., Response to Final Office Action dated Dec. 6, 2012 in U.S. Appl. No. 11/167,785, filed Mar. 6, 2013, 13 pages.
Examination Report from European Application No. 05750705.5 issued Mar. 11, 2013 (9 pages).
Fish & Richardson, P.C., Amendment After Allowance in U.S. Appl. No. 12/857,206, filed Feb. 21, 2013, 10 pages.
Response to European Patent Office communication from European application No. 06785637.7 mailed Apr. 27, 2012, filed Jun. 24, 2012, 3 pages.

\* cited by examiner

HANDING OFF ACTIVE CONNECTIONS

BACKGROUND

This disclosure relates to active handoffs between radio networks.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a radio node (RN) or base transceiver station (BTS), is located to serve access terminals 114, 116 (e.g., cellular telephones, laptops, PDAs) located in the cell. Access terminals (AT) are sometimes referred to as mobile stations (MS) or user equipment (UE). Each cell is often further divided into sectors 102a-c, 104a-c, 106a-c by using multiple sectorized antennas. An RN is identified by one or more of several properties, which may include the offset of a pseudonoise pattern in its pilot signal (PN offset), a frequency, an IP address, or a SectorID. In each cell, that cell's radio network access point may serve one or more sectors and may communicate with multiple access terminals in its cell.

When an access terminal moves from one sector or cell to another and control of the access terminal is transitioned between different network elements, the transfer is referred to as handoff. If the access terminal has a call in progress during handoff, the handoff is said to be active. Co-pending patent application Ser. No. 11/037,896, filed Jan. 18, 2005, and titled Radio Network Control, also assigned to Airvana, Inc., described active handoffs in partially-connected radio networks. The type of handoff described in that application is now standardized as the A16 interface in the TIA-878-B standard. According to the standard, A16 handoff is a hard handoff, such that during the handoff, the source radio network controller cannot add the target radio node to its active set, and the target radio network controller cannot add the source radio node to its active set.

SUMMARY

In general, in one aspect, a connection is established between an access terminal and a first radio network controller through a first radio node. The first radio node is controllable primarily by the first radio network controller. The connection is maintained with the first radio network controller as the access terminal moves from a coverage area of the first radio node toward a coverage area of a second radio node. The second radio node is controllable primarily by a second radio network controller and controllable subordinately by the first radio network controller. A connection is also established through the second radio node. Upon a fulfillment of a pre-determined criterion, the connection is transferred from the first radio network controller to the second radio network controller.

Implementations may include one or more of the following features. The first and second radio network controllers are located in different subnets. The criterion is fulfilled when the first radio node is dropped from an active set of the access terminal. The first radio node is dropped from the active set of the access terminal when a strength of a signal of the first radio node falls below a minimum threshold. The criterion is fulfilled when a strength of a signal of the first radio node falls below a minimum threshold. The connection uses the Ev-DO, CDMA2000, W-CDMA, HSUPA, HSDPA, HSPA, or LTE telecommunications standard. The connection uses voice over IP (VoIP) protocol. The first radio node is also controlled by a third radio network controller. The second radio network controller continues to control the session until a predetermined criterion is fulfilled. The criterion is fulfilled when the active set of the access terminal contains only radio nodes that are controlled subordinately by the second radio network controller. The second radio node sends the second RNC's address to the first RNC.

In general, in one aspect, a connection is established between an access terminal and a first radio network controller, through both a first radio node and a second radio node. The connection is maintained with the first radio network controller as the access terminal moves from a coverage area of the first radio node toward a coverage area of a second radio node. The connection is transferred to a second radio network controller. The connection is maintained with the second radio network controller as the access terminal returns toward the coverage area of the first radio node. The connection is transferred to the first radio network controller once an active set of the access terminal contains no radio nodes primarily controllable by the second radio network controller.

DESCRIPTION

Figure 2:
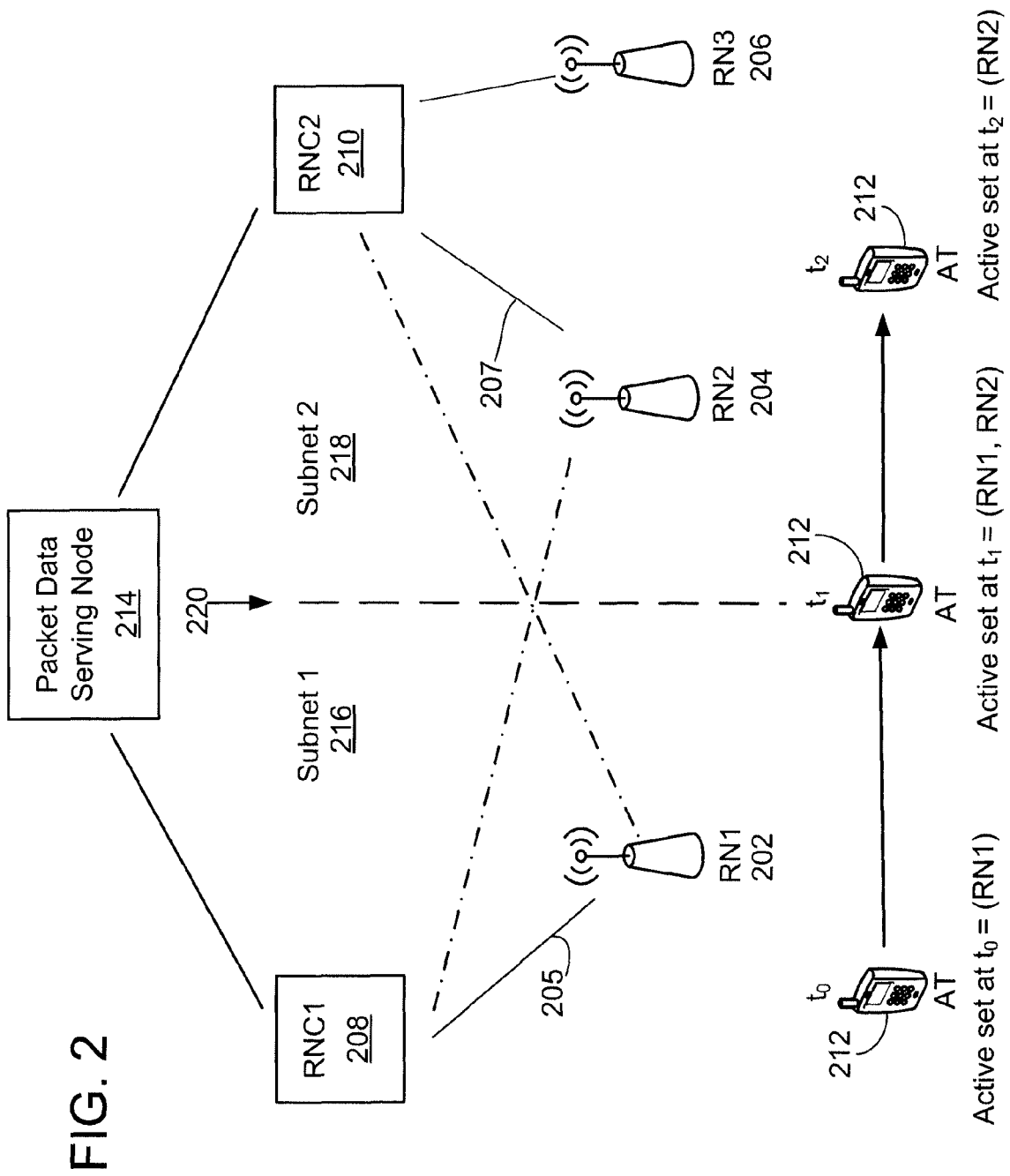
Figure 3:
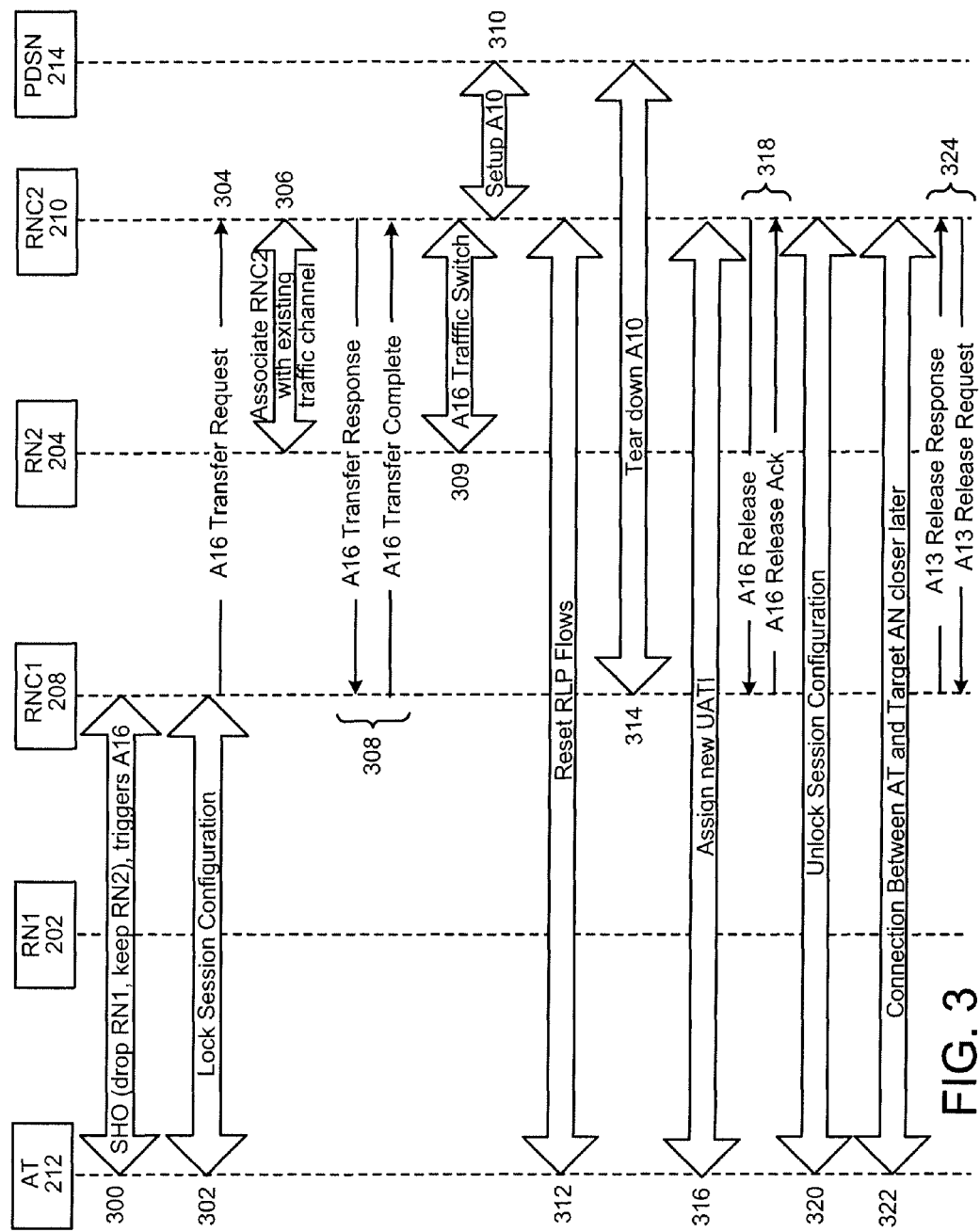

FIG. 1 is a block diagram of a radio area network.
FIG. 2 is a flow chart.
FIG. 3 is a messaging diagram.

Referring to FIG. 1, in some examples, a radio access network (RAN) 100 uses an Ev-DO protocol to transmit data packets between an access terminal, e.g., access terminals 114 and 116, and a radio node, e.g., radio nodes 108, 110, 112. The radio nodes are connected over a backhaul connection 118 to radio network control/packet data serving nodes (RNC/PDSN) 120, which may be one or more physical devices at different locations. Each cell may be divided into sectors 102a-c, 104a-c, 106a-c by antennas as noted above. In each cell, that cell's radio network access point may serve one or more sectors and may communicate with multiple access terminals in its cell. Although this description uses terminology from Ev-DO standards, the same concepts are applicable to other communication methods, including Code Division Multiple Access 2000 (CDMA2000); Wideband Code Division Multiple Access (W-CDMA); High-Speed Uplink Packet Access (HSUPA); High-Speed Downlink Packet Access (HSDPA); High-Speed Packet Access (HSPA), Long Term Evolution (LTE), and the like.

In some examples, as shown in FIG. 2, multihoming allows a single radio node 202 to be controlled by two or more radio network controllers 208 and 210. Traditionally, RNs located within a subnet of a radio area network are controlled by only one RNC located within the same subnet. In contrast, a multihoming system works by associating RNs located near a subnet boundary 220 with at least two RNCs 208 and 210. In some examples, such as that illustrated by FIG. 2, the RNCs 208 and 210 that jointly control the RN 202 are located in different subnets 216 and 218.

When one RN 202 is multihomed, i.e., controlled by two RNCs 208 and 210, we describe one of the RNCs as the primary RNC, and we describe the other RNC as the secondary RNC. In the example of FIG. 2, the RN 202 is multihomed to the RNCs 208 and 210. For purposes of this example, the RNC 208 is the primary RNC, shown by a solid line 205, and the RNC 210 is the secondary RNC, shown by a dashed line 207. We say the RN 202 is primarily homed to the primary RNC 208 and secondarily homed to the secondary RNC 210. There may be more than one secondary RNC.

In its broadest sense, a node is considered to be multihomed if that node has multiple ways of reaching a destination. In the context of mobile wireless networks and the example of FIG. 2, the destination is the packet data serving node (PDSN) 214, and RNs 202 and 204 that are multihomed may communicate with a PDSN 214 through at least two different RNCs 208 and 210. By using multihoming, the functions of the primary RNC are assumed by the secondary RNC when the primary RNC becomes unavailable (e.g., when the AT moves out of range of any RN controlled by the primary RNC), or less desirable (e.g., the AT moves closer to an RN located within the control of the secondary RNC). Uninterrupted connectivity can be achieved if at least one connection to the PDSN is maintained.

When an AT 212 is in handoff from one RNC to another, the RNC 208 originally controlling the AT 212 is the serving RNC, and the RNC 210 to which control is being transferred is the target RNC. When the radio node 202 is multihomed, its primary RNC 208 may be the serving RNC for the AT 212 that is moving to the second RN 204, which happens to be primarily homed to the first RN's secondary RNC 210, such that the first RN's secondary RNC is the target RNC. At the same time, from that second RN 204's point of view, it's primary RNC 210 is the target RNC for the incoming AT 212, and the serving RNC is the secondary RNC 208.

In some examples, as the AT moves from the coverage area of one RN to the coverage area of another RN, it sends a RouteUpdate message to its serving RNC. The RouteUpdate message indicates the identification and strength of any compatible radio nodes' pilot signals that the AT can detect at its current location. The serving RNC uses the RouteUpdate message to trigger and perform normal soft handoffs, in which the AT is transitioned to another RN controlled by the same RNC without dropping any active calls. Through these RouteUpdate messages, the serving RNC obtains a fairly accurate assessment of where the AT is located. The RNC uses this information to trigger an active RNC handoff.

An AT's "active set" refers to the set of available RNs whose pilot signals are received by the AT and are sufficiently strong to remain in communication with the AT. Thus, if an AT were being served by both RN1 and RN2, its active set would be the pilot signals for both RN1 and RN2, which we represent in the parenthetical form (RN1, RN2). An RN is dropped from an AT's active set when its pilot falls below a certain minimum strength threshold. In traditional wireless networks, all the RNs in an ATs active set must be controlled by the same RNC.

In traditional wireless networks using the TIA-878-B standard, an AT crossing the boundary between two RNCs needs to end communication with the serving RNC in order to establish a communication link with the target RNC. These A16 handoffs are "hard handoffs" because while the AT is controlled by the source RNC, it cannot add a target RN controlled only by the target RNC to its active set, and once controlled by the target RNC, the AT could not keep the source RN controlled only by the source RNC in its active set. Because of the lack of overlap in the active sets before and after handoff, a connection cannot be maintained.

In some examples, enhancements to the handoff methods in multi-homed networks allow an A16 handoff to be converted into a soft handoff, rather than a hard handoff. This allows more robust handoffs to take place between radio nodes that otherwise would be controlled by separate radio network controllers, requiring hard handoff, and for active calls to be handed off without being dropped.

To provide a multi-homed handoff, each RN associates a single traffic channel with the two (or more) RNCs that are controlling it. In some examples, one or two layers of RNs of each subnet, generally those near the boundary 220 between subnets 216 and 218, are secondarily homed to the RNC controlling the RNs on the other subnet, which will be the target RNC when an AT is handed off across the boundary. With the bordering RNs homed to both source and target RNCs, the AT is able to add the pilots signals of target RNs to its active set when it is located near a boundary, and to keep the source RNs in its active set during the handoff. The primary RNC knows that the AT is near the subnet boundary when the AT begins to report pilots from both RNs in the RouteUpdate message.

When the AT 212 is in transition range (e.g., near a subnet boundary 220, shown as position $t_1$ in FIG. 2), all the RNs in the active set are homed to both RNCs 208 and 210, such that the active set is the same immediately before and after handoff between the two RNCs. Before the AT is in range (e.g., where the AT 212 is at position $t_0$), its active set includes RNs of only the original serving RNC. After the AT moves past the transition range (e.g., where AT 212 is at position $t_2$), as discussed below, the RNs of the original serving RNC 208 are removed, so that the active set includes RNs of only the target RNC 210. In both cases, the transition to and from the joint active set is done with standard soft handoff. While the active set is (RN1, RN2), the AT 212 may begin using the RN2 204. Thus, when the AT moves from the RN1 202 toward the RN2 204, with the RNC subnet boundary 220 between the two, the active set transitions as: (RN1)→(RN1, RN2)→(RN2). Because communication with at least one RN is preserved throughout the handoff, each handoff is soft and connectivity is maintained without interruption.

Handoff is triggered when a predetermined criterion is fulfilled. For example, as the AT 212 moves away from the first subnet 216, the strength of the pilot signal of the RN 202 will decrease until the RN is dropped form the AT's active set. The target RNC is then selected based on the strongest pilot in the AT's active set. When all the pilots in the AT's active set are only secondarily homed to the serving RNC, control of the AT, including any initiated connections, is transferred to the target RNC. Referring to FIG. 2 as an example, when the AT reaches position $t_2$ and drops RN1 from its actives set, the only RN left in the active set is RN2, which is primarily homed to the target RNC2 210 and only secondarily homed to the source RNC1 208. By triggering handoff at this point, rather than waiting until the AT moves so far into the subnet 218 that the serving RNC 208 may not be homed to any RNs, both the serving RNC 208 and the target RNC 210 can access the RNs in the active set during handoff.

Delaying handoff until all RNs primarily homed to the source RNC are dropped from the active set helps prevent handoff ping-pong, where an AT that stays near the subnet border is continually handed off, back and forth between the two subnets. If the AT 212 moves back toward the subnet boundary 220, it will add the RN1 202 back into the active set, but it will not handoff back to the RNC 208 unless it moves so far into the subnet 216 that the RN2 204 is dropped. As long as the AT stays near the boundary 220, the active set will include RNs primarily homed to both RNCs and handoff will not take place. Delaying handoff also reduces the amount of A16 session transfer latency and the number of dropped calls, as the active set remains the same during the A16 handoff.

To facilitate this type of handoff, the target RN 204 sends its primary RNC's 210 address (e.g., an IP address if an IP backhaul network is used to connect the RNCs and RNs) to its secondary RNC 208. With this information, the serving (secondary to RN 204) RNC 208 can find the target (primary as to RN 204) RNC 210 automatically rather than through operator configuration.

Relevant elements of the flow of messaging and control to implement multihomed soft handoff is shown in FIG. 3. The A16 handoff is triggered 300 when RN1 is dropped from the AT's active set and the AT informs the source RNC1 about the change. The session configuration is locked 302 to avoid session configuration change in the middle of a handoff. Next, the source RNC1 sends 304 an A16 transfer request to the target RNC2. The RN2 associates 306 the existing traffic channel over which it serving the AT with the target RNC2. This will allow the active connection to be transferred to RNC2 without dropping. Once the traffic channel is associated with RNC2, RNC2 and RNC1 acknowledge completion of the transfer by sending 308 A16 transfer response and A16 transfer complete messages, respectively.

The RNC2 next sets up 310 an A10 connection to the PDSN and resets 312 the RLP flows with the AT. The former A10 connection from the RNC1 to the PDSN is torn down 314, and the target RNC2 assigns 316 a new Unicast Access Terminal Identifier (UATI) to the AT. A16 Release and Release acknowledge signals are exchanged 318 between the RNC1 208 and RNC2 210 to let the source RNC release the session. The session configuration is then unlocked 320. Some time later, the connection between the AT 212 and the target RN2 204 is closed 322 and A13 release request and response messages are exchanged 324 between the RNCs. The A13 release request is sent to the source RNC which requests that the source RNC release the UATI assigned by said source RNC, finally completing the handoff.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims and other claims to which the applicant may be entitled. The following are examples for illustration only and do not limit the alternatives in any way.

What is claimed is:

1. A method performed in a radio access network, the method comprising:
    establishing a session between an access terminal and a first radio network controller through a first radio node, the first radio node being controllable primarily by the first radio network controller,
    maintaining the session with the first radio network controller as the access terminal moves from a coverage area of the first radio node toward a coverage area of a second radio node, the second radio node being controllable primarily by a second radio network controller and controllable subordinately by the first radio network controller,
    establishing a route for the session established with the first radio network controller through the second radio node, and
    responsive to determining that an active set of the access terminal contains only radio nodes which are subordinately controlled by the first radio network controller, initiating an active handoff from the first radio network controller of a first subnet to the second radio network controller of a second subnet including transferring the session from the first radio network controller to the second radio network controller without dropping an active call associated with the session, wherein the first and second radio network controllers are located in different subnets of the radio access network.

2. The method of claim 1 in which the the determination that the active set of the access terminal contains only radio nodes which are subordinately controllable by the first radio network controller is fulfilled when the first radio node is dropped from the active set of the access terminal.

3. The method of claim 2 in which the first radio node is dropped from the active set of the access terminal when a strength of a signal of the first radio node falls below a minimum threshold.

4. The method of claim 1 in which the determination that the active set of the access terminal contains only radio nodes which are subordinately controllable by the first radio network controller is fulfilled when a strength of a signal of the first radio node falls below a minimum threshold.

5. The method of claim 1 in which the connection uses the Ev-DO, CDMA2000, W-CDMA, HSUPA, HSDPA, HSPA, or LTE telecommunications standard.

6. The method of claim 1 in which the session uses voice over IP (VoIP) protocol.

7. The method of claim 1 in which the first radio node is also controlled by a third radio network controller.

8. The method of claim 1 in which the second radio network controller continues to control the session until a second predetermined criterion is fulfilled.

9. The method of claim 8 in which the session is transferred back to the first radio network controller from the second radio network controller after the second predetermined criterion is fulfilled, the second predetermined criterion being fulfilled when the active set of the access terminal contains only radio nodes that are both controlled subordinately by the second radio network controller and controlled primarily by the first radio network controller.

10. The method of claim 1 in which the second radio node sends an address of the second radio network controller to the first radio network controller.

11. An apparatus comprising:
a first radio network controller to:
establish a session with an access terminal through a first radio node, the first radio node being controllable primarily by the first radio network controller,
maintain the session as the access terminal moves from the coverage area of the first radio node toward a coverage area of a second radio node, the second radio node being controllable primarily by a second radio network controller and controllable subordinately by the first radio network controller,
establish a route for the session established with the first radio network controller through the second radio node, and
responsive to determining that an active set of the access terminal contains only radio nodes which are subordinately controlled by the first radio network controller, initiate an active handoff from the first radio network controller of a first subnet to the second radio network controller of a second subnet including transferring the session from the first radio network controller to the second radio network controller without dropping an active call associated with the session, wherein the first and second radio network controllers are located in different subnets of a radio access network.

12. A computer program stored on a non-transitory machine-readable storage medium, comprising instructions to cause a radio network controller to:
establish a session to an access terminal through a first radio node, the first radio node being controllable primarily by the first radio network controller,
maintain the session as the access terminal moves from the coverage area of the first radio node toward the coverage area of a second radio node, the second radio node being controllable primarily by a second radio network controller and controllable subordinately by the first radio network controller,
establish a route for the session established with the first radio network controller through the second radio node, and
responsive to determining that an active set of the access terminal contains only radio nodes which are subordinately controlled by the first radio network controller, initiating an active handoff from the first radio network controller of a first subnet to the second radio network controller of a second subnet including transferring the session from the first radio network controller to the second radio network controller without dropping an active call associated with the session, wherein the first and second radio network controllers are located in different subnets of a radio access network.

13. A system comprising:
a first radio network controller, a second radio network controller, a first radio node, and a second radio node, the first and second radio network controllers being located in different subnets of a radio access network, which is:
the first radio network controller is configured to establish a session to an access terminal through the first radio node, the first radio node being controlled primarily by the first radio network controller,
the first radio network controller is configured to maintain the session as the access terminal moves from the coverage area of the first radio node toward the coverage area of the second radio node, the second radio node being controllable primarily by the second radio network controller and controllable subordinately by the first radio network controller,
the first radio network controller is configured to re-route the session established with the first radio network controller through the second radio node,
the first radio node controller is configured to, responsive to determining that an active set of the access terminal contains only radio nodes which are subordinately controlled by the first radio network controller, initiate an active handoff from the first radio network controller of a first subnet to the second radio network controller of a second subnet including transferring the session from the first radio network controller to the second radio network controller without dropping an active call associated with the session; and
the second radio network controller is configured to assume control of the session upon the fulfillment of a first predetermined criterion.

14. The system of claim 13 in which the first radio node is also controlled by a third radio network controller.

* * * * *